OR 3,381,918

May 7, 1968 R. JACQUART ET AL 3,381,918

VARIABLE-GEOMETRY AIRCRAFT

Filed Sept. 15, 1966 4 Sheets-Sheet 1

May 7, 1968 R. JACQUART ET AL 3,381,918

VARIABLE-GEOMETRY AIRCRAFT

Filed Sept. 15, 1966 4 Sheets-Sheet 3

United States Patent Office 3,381,918
Patented May 7, 1968

1

3,381,918
VARIABLE-GEOMETRY AIRCRAFT

Raymond Jacquart, Boulogne-sur-Seine, and Richard Désiré Haze, Saint-Ouen, France, assignors to Sud-Aviation Société Nationale de Constructions Aeronautiques, Paris, France Filed Sept. 15, 1966, Ser. No. 579,645
Claims priority, application France, Sept. 20, 1965, 31,906, Patent 1,457,577
9 Claims. (Cl. 244—46)

It is well known that when the speed of an aircraft is relatively low, especially during takeoff and landing, it is preferable for the wings to have minimum sweepback. In flight, on the contrary, it is preferable for the sweepback to be all the greater as the speed is higher in order to reduce wing drag as much as possible.

The widening gulf between aircraft takeoff speeds and cruising speeds has led to the concept and construction of aircraft of which the geometrical and hence the aerodynamic characteristics are variable in flight as a function of the flight speed. Thus, numerous devices are known whereby the configuration of the wings of an aircraft can be modified in flight, notable examples being the so-called "variable geometry" aircraft in which the sweepback is modified by moving the wings in relation to the fuselage in simple or compound motions. Such examples include devices which swivel each wing about a pivot so as to effect a transition from sharp sweepback suited to high speeds (due to reduced drag) to light sweepback for obtaining the necessary lift at low speeds, especially during takeoff and landing.

It should, however, be noted that these known devices have an inherent disadvantage stemming from the fact that the swivelling of the wings results in a shift in the centre of pressure of the aerodynamic forces exerted thereon and in a displacement of the centre of gravity of the aircraft. Further, the position of the centre of thrust is affected by the flight speed, with the transition from subsonic to supersonic speed notably resulting in a large rearward shift of the centre of pressure of the forces exerted on the wings.

In order to reduce the effect of these phenomena, the solution adopted was to so locate the hinge axis of each wing as to reduce as much as possible such variations during wing movement and to achieve, at least for the two limit positions of the wing corresponding to specific flight speeds, conditions of equilibrium consistent with elevator efficiency and deflection. This, however, could but result in approximate designs stemming from compromises between constructional feasibility and the theoretical ideal.

This in turn led to the devising of systems permitting not only swivelling of the wing but also longitudinal displacement thereof, thereby making it possible, through suitable control means and appropriately combined swivelling and displacement, to shift the hinge axis of the wing and hence the centre of pressure so as to match the aircraft geometry to all flight speeds.

This invention relates to a variable-geometry monoplane aircraft of the type in which the wings have a single central hinge axis and are displaceable longitudinally, the pivoting and translation motions of the wings being either independent or combined together.

In accordance with the invention, each wing is pivotally connected to a central pivot which is common to the two wings and which is rigid with a central slide movable in parallelism with the fuselage axis, each wing being furthermore connected through link means to a further lateral slide which is likewise movable preferably parallel to said fuselage axis.

In a preferred form of embodiment of the present invention, the longitudinal movements of the different slides are obtained by means of threaded rods respectively cooperating with each of said slides. Said threaded rods may be driven with advantage by a common drive shaft, through the medium of a worm-type reduction gear. They may be parallel to one another, with the two lateral rods being positioned symmetrically in relation to the centerplane of the fuselage, in which plane lies the axis of the central rod. A gearbox is provided on the threaded rod associated to the central slide, between the latter and the reduction gear driving said threaded rod, and said gearbox is controlled by the pilot in such manner as to combine the relative rotational and translational movements of the wings.

It will readily be appreciated that since the system is symmetrical in relation to the longitudinal centerplane of the aircraft, if the three slides move at the same speed then the two wings will be moved bodily in translation, i.e., parallel with themselves, and if, conversely, the central slide moves at a different speed to the other two slides then the wings will swivel at the same time as they shift longitudinally.

In this way the sweepback of the wings and their position along the fuselage can be varied at will. The system according to the present invention thus provides a simple solution to the problem set forth in the preamble above, by recourse solely to simple and robust elements.

The description which follows with reference to the accompanying non-limitative exemplary drawings will give a clear understanding of how the invention can be carried into practice.

Figure 2:
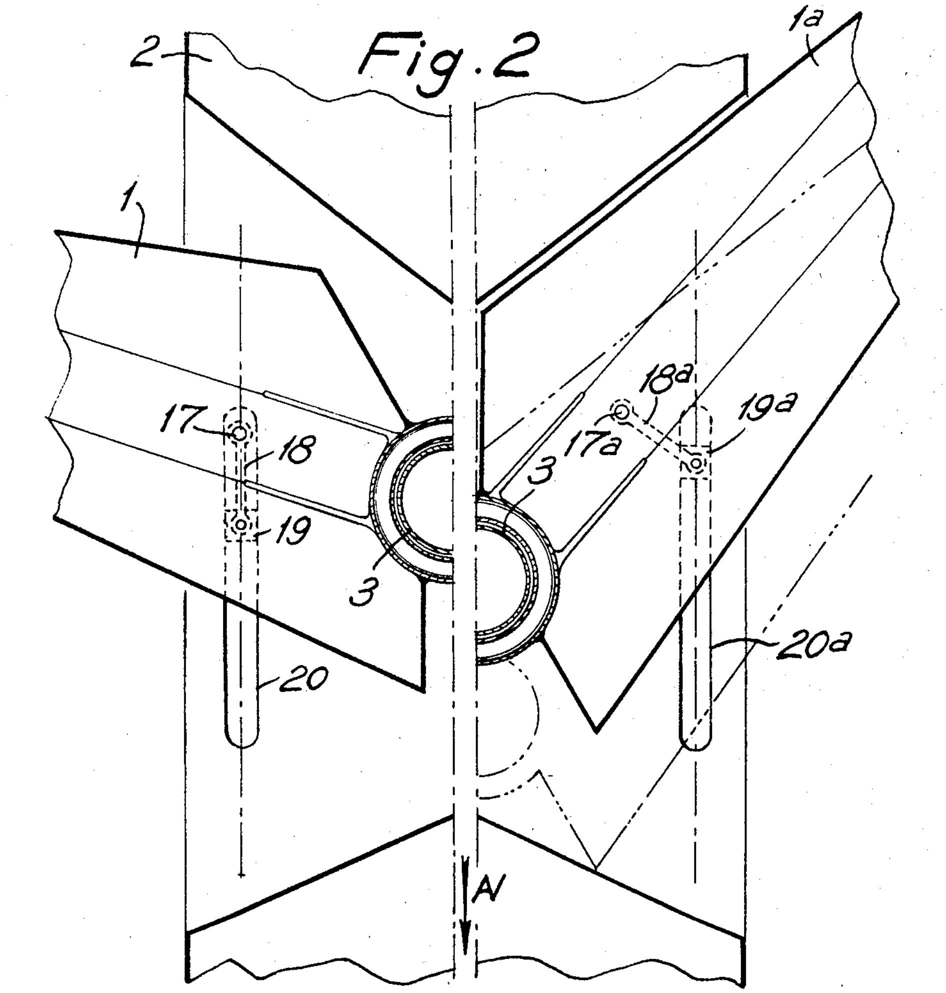
FIGURE 2 is a section taken through the line II—II of FIGURE 1, the two halves of the figure showing different positions of the corresponding wing.
Figure 1:
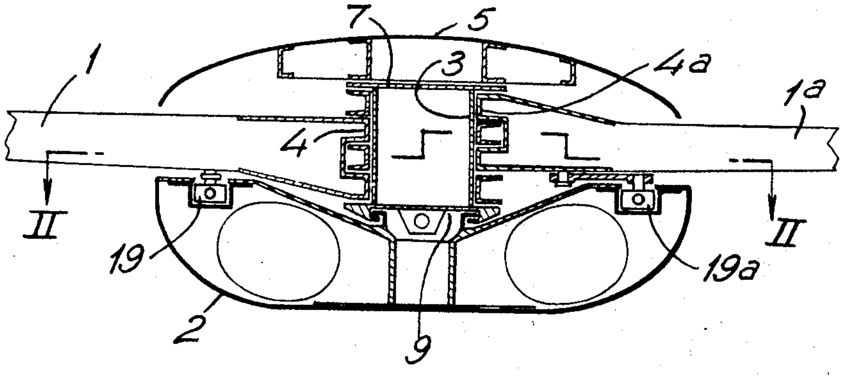
FIGURE 1 is a schematic cross-sectional view of an aircraft fuselage equipped with the subject device of the invention.

FIGURES 1 and 2 illustrate the portion of an aircraft where the wings 1, 1*a* are mounted on the fuselage 2. As is clearly shown, each wing has its inboard end hingedly connected to a large-diameter common central pivot 3 having its axis substantially perpendicular to the fuselage axis and lying in the longitudinal centerplane of the aircraft. The hinges comprise double fork-ended fittings, 4 and 4*a* respectively, rigid with the main spars of the associated wings 1, 1*a*, respectively. The entire assembly can be mounted in the fuselage following removal of a cover 5 fitted over the top of the fuselage.

The central pivot 3, which may utilize either plain or anti-friction bearings 6 (see FIG. 3) includes at its top a circular plate 7 which is fixed to the body of the pivot by means of a set of bolts 8 and which clamps on to the fork-ends 4, 4*a* shown in FIGURE 1 so as to maintain them in position and transmit the lift forces. The other end of pivot 3 is rigid with a slide 9 the bottom of which is formed with two flanges 10 having inwardly turned edges and slidingly cooperating with two hollow guide rails 11 parallel and symmetrical to the longitudinal centerplane of the aircraft. The lower part of slide 9 further includes an internally threaded boss 12 through which extends a central rod 13 formed with a preferably square thread thereon, and this central rod is supported at each end in a bearing 14 fixed to the centerline of the fuselage. Bearings 14 are devised as abutments in order to transmit the drag forces. Central rod 13 is rotated by a gearbox the power input to which is provided by a worm-type reduction gear 16.

Carried on a rib on each wing 1, 1*a*, at a suitable distance from the central pivot, are fittings 17, 17*a* respectively, the lower cylindrical portion 17*b* of which stands proud of the wing with its axis substantially parallel to that of pivot 3. Pivotally connected to said fittings are links 18, 18*a* respectively the other ends of which are pivotally connected to secondary slides 19, 19*a* respectively adapted to slide in lateral guide slots 20, 20*a* parallel to rails 11. Slides 19, 19*a* have extending therethrough lateral, preferably square-threaded rods 21, 21*a*, respectively, which are parallel to the central threaded rod 13 and of the same screw-pitch, which are mounted in thrust bearings 22, 22*a* rigid with the fuselage, and which are rotated through reduction gears 23, 23*a* arranged in transverse alignment with reduction gear 16.

The three reduction gears 16, 23 and 23*a* which drive the three parallel threaded rods 13, 21 and 21*a* are driven off a common shaft 24 perpendicular thereto and adapted to be rotated by an electric motor 25.

Figure 6:
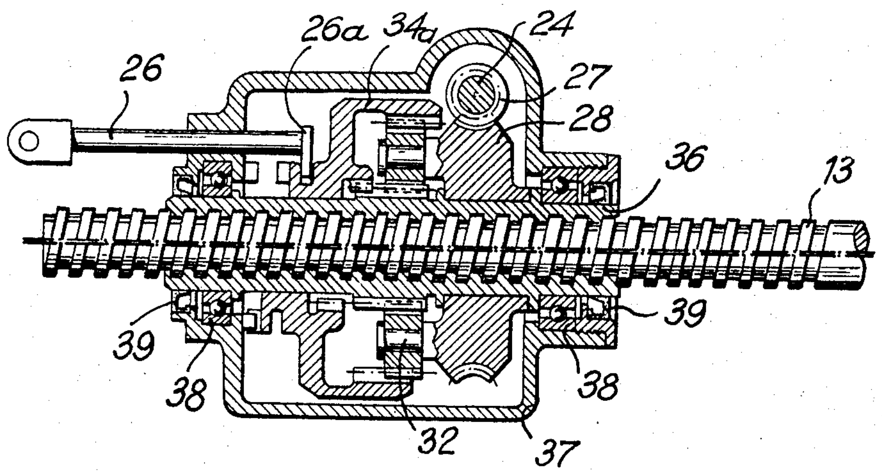
FIGURE 6 shows an alternative embodiment with reference to FIGURE 5, for use with the constructional form shown in FIGURE 4.
Figure 5:
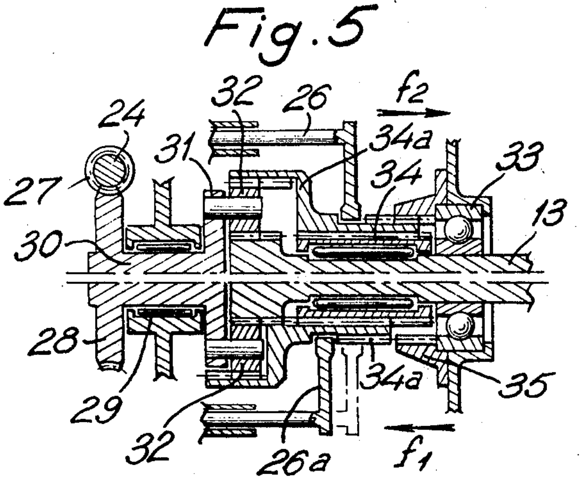
FIGURE 5 shows in longitudinal section the gearbox and central reduction gear for equipping the subject device of the invention, with each half of the figure showing the gearbox in a different operating configuration.

Gearbox 15 and reduction gear 16, which are mounted on the central threaded rod 13, are shown in the longitudinal sectional views of FIGURES 5 and 6. In these figures, the upper and lower half-sections correspond to two positions of a pilot-operable control member 26 which, through suitable linkage (not shown), may be caused to drive the slides at the same speed or at different speeds via central threaded rod 13 and the lateral threaded rods 21, 21*a*.

Figure 3:
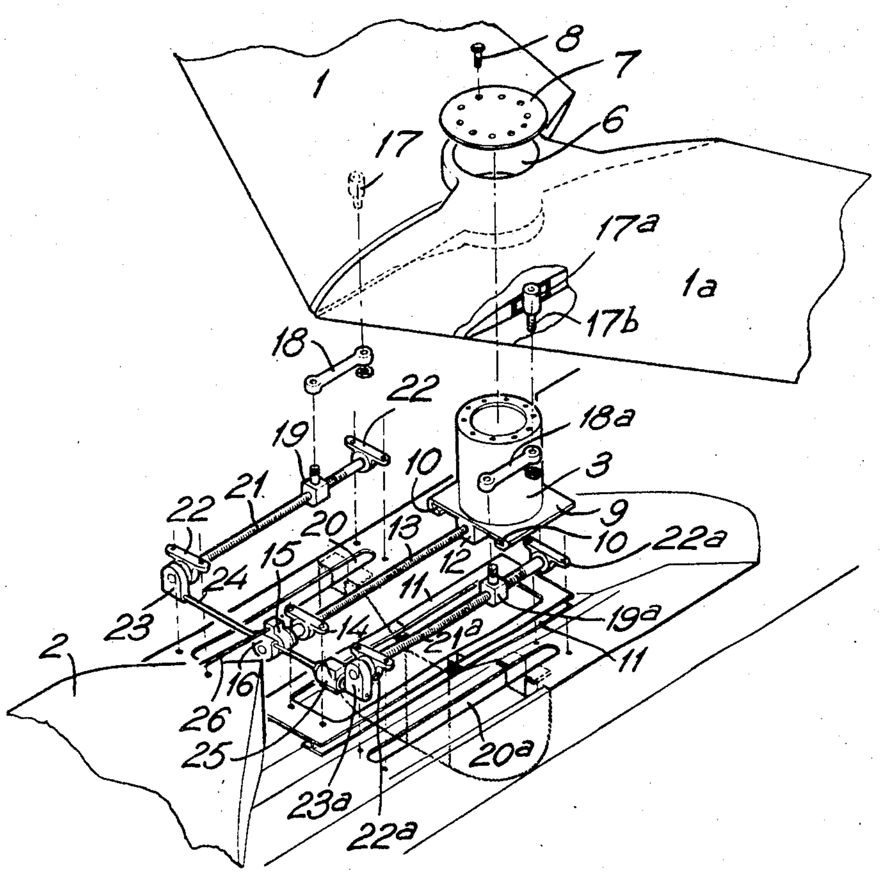
FIGURE 3 is an exploded perspective view of the subject device of the invention.

In the device shown in FIGURE 5, which corresponds to the overall view of FIGURE 3, drive shaft 24 carries a worm gear 27 driving a gearwheel 28 carried in a roller-bearing 29 rigid with the fuselage. The axle 30 of wheel 28 terminates in a flange 31 located on the side of bearing 29 remote from worm 27. Loosely mounted on flange 31 is a planet pinion 32 with its axis parallel to axle 30. Central threaded rod 13, lying in the extension of axle 30, coaxially therewith, is carried in a ball-bearing 33 rigid with the fuselage and terminates in a toothed portion meshing with planet pinion 32. Between its end and bearing 33, rod 13 carries an elongated roller-bearing 34 surrounded by a sleeve 34*a* which is adapted to positively rotate it through longitudinal teeth whilst being able to slide axially. At its end adjacent reduction gear 24, 28, sleeve 34*a* is extended to form a cylindrical bell formed with longitudinal inner teeth which are in constant mesh with planet pinion 32 irrespective of the longitudinal position of sleeve 34*a*. Further, the teeth which couple said sleeve to elongated bearing 34 engage with the teeth formed on the end of rod 13 when sleeve 34*a* is in the position shown on the lower half of FIGURE 5, i.e. when it is thrust as far as possible towards flange 31 in the direction of arrow $f_1$. In the other limit position on the upper half of FIGURE 5, said sleeve is in abutment in the direction of arrow $f_2$ and has disengaged from pinion 32 but meshes, through longitudinal external teeth formed on its other end, with a ring having internal axial teeth 35 and rigidly connected to the fixed cage of bearing 33.

Such a gearbox operates in perfectly classic manner: sliding motions of control member 26 are transmitted to sleeve 34*a* through the medium of a peg 26*a* carried by member 26 and adapted to penetrate into an annular groove formed on the outer surface of the sleeve. In the position shown at the bottom of the figure, planet pinion 32 is clamped at both extremities of a diameter by the non-deformable system consisting of sleeve 34*a* and the toothed end of rod 13. Planet pinion 32 cannot therefore rotate and rigidly interconnects flange 31 with rod 13, which rod consequently has the same rotational speed as gearwheel 28. In the other position, on the contrary, pinion 32 is free to rotate and operates as a planet pinion by rotating rod 13 at a speed higher than that of gearwheel 28.

Figure 4:
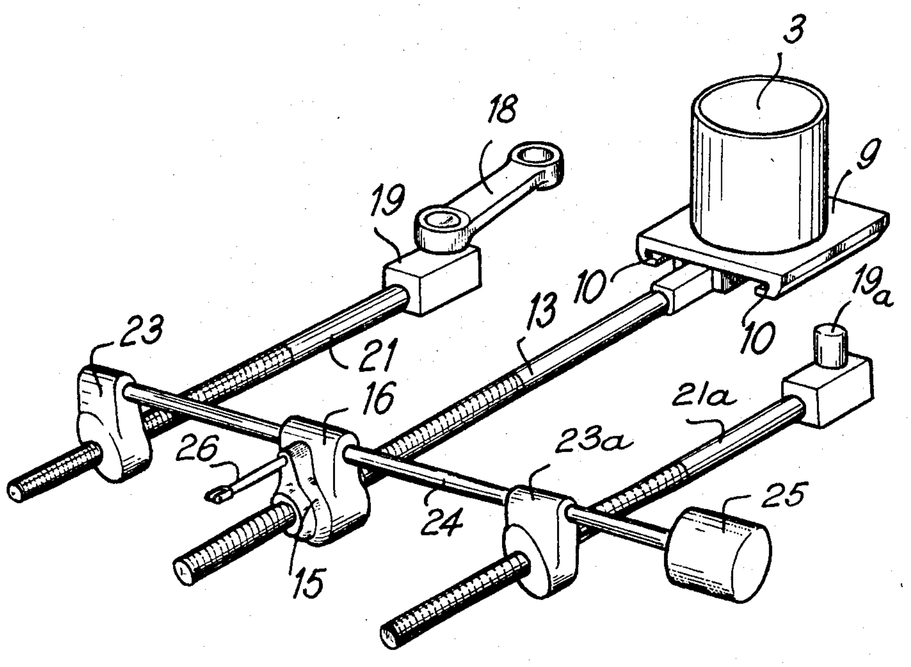
FIGURE 4 is a fragmental perspective view of an alternative embodiment of the device shown in FIGURE 3.

In the constructional form shown in FIGURE 4, threaded rods 13, 21 and 21*a* do not extend through their respective slides 9, 19 and 19*a* but are fixed thereto at one end without being able to rotate. They are translated axially by associated reduction gears 16, 23 and 23*a* which, instead of rotating the rods directly, rotate internally threaded sleeves which mesh with the screw-thread formed on said rods.

Considering next the central rod 13, the same is likewise rotated by the gearbox 15 shown in FIGURE 6, in which like parts or parts performing the same function are designated by the same reference numerals as those in FIGURE 4. Gearbox 15 is housed with reduction gear 16 in a casing 37 which has extending therethrough a sleeve meshing with rod 13 (as mentioned precedingly) and designated by reference numeral 36. Said sleeve is connected to casing 37 at its two ends, without possibility of axial motion, via two ball-bearings 38 fitted with hermetic seals 39 to prevent the ingress of extraneous matter. Gearwheel 28 is fixedly mounted on sleeve 36. Also to be seen in planet pinion 32 engaging with sliding sleeve 34*a*. as well as the control member 26 and its peg 26*a*. The gearbox hereinbefore described functions in the same way as the device shown in FIGURE 5 and therefore calls for no further explanation.

Figure 8:
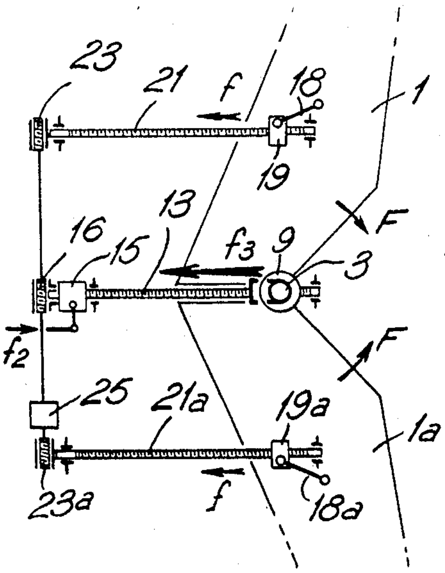
FIGURES 7 and 8 are diagrammatic views in elevation intended to explain the manner of operation of the subject device of the invention.
Figure 7:
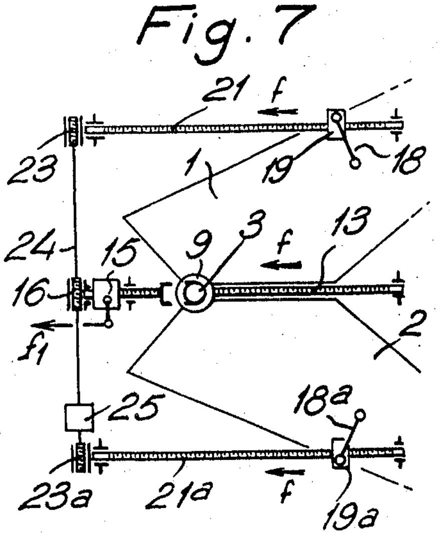

FIGURES 7 and 8 schematically illustrate the principle of operation of the subject device of the invention. When gearbox 15 is in the position in which the same rotational speed is imparted to the three threaded rods 13, 21 and 21*a* (FIG. 7), the three slides 9, 19 and 19*a* are translated at the same speed and no alteration in the sweepback of wings 1, 1*a* takes place, the wings being merely translated longitudinally in one direction or the other, thereby enabling the centres of pressure and gravity to be located as required on the fuselage.

In contradistinction, when central threaded rod 13 rotates faster than the other two rods (FIG. 8), slide 9 and hence wing pivot 3 move faster than the other two slides 19 and 19*a*, so that swivelling motion of wings, 1, 1*a* is combined with translational motion thereof thereby altering the sweepback. If the slides move in the direction of arrows *f* in FIGURE 8, for example, the wings will swivel in the direction of arrows F.

The plain translation considered in FIGURE 7 will permit of moving, say, from the wing position shown in solid lines on the right-hand half of FIGURE 2 to the position shown in broken lines on the same half of the figure.

The operation of modifying the sweepback so as to move, say, from the position shown in broken lines in FIGURE 2 to the position shown on the left-hand half of that figure, consists in reversing the direction of rotation of the threaded rods so as to botain relative slide displacements as explained hereinabove with reference to FIGURE 8.

If necessary the wing may be recentered by plain translation.

Takeoff having taken place with the wing at minimum sweepbcak, the subject control system of the invention is then operated in the appropriate sense and at different rotation speeds of the threaded rods whereby to adapt the wing sweepback to the selected flight speed. The geometrical characteristics of the whole are naturally such that the translation superimposed upon the wing sweepback motion continuously locates the wings in a position along the fuselage that is as close as possible to the optimum position in relation to the centres of pressure and gravity. This position can then easily be adjusted by plain longitudinal translation by rotating the three threaded rods at the same speed.

It goes without saying that many detail modifications may be made to the specific forms of embodiment hereinbefore described, without departing from the spirit and scope of the invention. By way of example, several combinations of movements could be used by interposing one or more corresponding control boxes on the threaded rods actuating the wings. Further, these control boxes, which are of the purely mechanical type in the constructional forms herein described, could be of any other convenient type, an example being the electromechanical type.

What we claim is:

1. In a variable geometry monoplane aircraft having two wings pivotally connected to a longitudinally displaceable central hinge-point, in combination, a central hinge pivot common to said two wings, a central slide bearing said pivot, first longitudinal guide means of said central slide positioned substantially parallel to the aircraft fore-aft axis, two lateral link members hingedly connected to the two wings and to two lateral slides respectively, second guide means of said lateral slides positioned substantially parallel with said first guide means, and means for moving either all the slides at the same speed or said central slide at a different speed from said lateral slides.

2. In a variable-geometry monoplane aircraft as claimed in claim 1, slide displacing means comprising a parallel threaded rod associated to and cooperating mechanically with each of said slides, the lateral threaded rods being positioned symmetrically with respect to a central threaded rod.

3. In a variable-geometry monoplane aircraft as claimed in claim 2, at least one threaded rod extending through a nut-like member rigidly connected to an associated slide, said threaded rod being free to undergo rotational motion but not translational motion.

4. In a variable-geometry monoplane aircraft as claimed in claim 2, at least one threaded rod rigidly connected to its associated slide and means for moving said slide comprising an internally threaded sleeve engaging with said threaded rod said sleeve being mounted rotatably but non-translatably.

5. In a variable-geometry monoplane aircraft as claimed in claim 1, a gearbox connected into said means for moving at least one of said slides, and a least one control member of said gearbox.

6. In a variable-geometry monoplane aircraft as claimed in claim 5, a control member movable between two positions, of which the first causes said central slide to move at a speed substantially equal to that of the other two slides whereby to permit translation of the set of wings without deformation thereof in relation to said fuselage and of which the second causes said central slide to move at a speed different from that of the other two slides whereby to superimpose a deformation and most notably a change in the sweepback of said wings upon the translational motion thereof.

7. In a variable-geometry monoplane aircraft as claimed in claim 1, means for moving each of said slides, said means being in rotating engagement with a common drive shaft through the agency of as many worm-type mechanical reduction gears.

8. In a variable-geometry monoplane aircraft as claimed in claim 1, a common central pivot receiving interleaving fork-ended fittings for respectively restraining said two wings.

9. In a variable-geometry monoplane aircraft as claimed in claim 1, a common central pivot, and attachment means for hingedly connecting said link members respectively to said wings and to the slides associated thereto, having geometrical axes which are mutually parallel and substantially perpendicular to the fore-aft axis of said aircraft.

References Cited

UNITED STATES PATENTS

| | | | |
|---|---|---|---|
| 2,683,574 | 7/1954 | Peterson | 244—46 |
| 2,695,144 | 11/1954 | Woods | 244—46 |
| 2,836,381 | 5/1958 | Carrillo Z | 244—43 |
| 3,206,146 | 9/1965 | Toms | 244—46 |

MILTON BUCHLER, *Primary Examiner.*

B. BELKIN, *Assistant Examiner.*